(12) United States Patent
Zhang et al.

(10) Patent No.: US 12,083,629 B2
(45) Date of Patent: Sep. 10, 2024

(54) WELDING METHOD FOR MANUFACTURING A HEAT SINK STRUCTURE

(71) Applicant: VAST GLORY ELECTRONIC & HARDWARE & PLASTIC (HUI ZHOU) LTD, Hui Zhou (CN)

(72) Inventors: Qing-Song Zhang, Hui Zhou (CN); Zhong-Long Zhu, Hui Zhou (CN)

(73) Assignee: VAST GLORY ELECTRONIC & HARDWARE & PLASTIC (HUI ZHOU) LTD, Hui Zhou (CN)

( * ) Notice: Subject to any disclaimer, the term of this patent is extended or adjusted under 35 U.S.C. 154(b) by 544 days.

(21) Appl. No.: 17/002,263

(22) Filed: Aug. 25, 2020

(65) Prior Publication Data
US 2021/0178527 A1 Jun. 17, 2021

(30) Foreign Application Priority Data
Dec. 13, 2019 (CN) .......................... 201911288382.1

(51) Int. Cl.
*B23K 37/00* (2006.01)
*C23C 24/04* (2006.01)
(Continued)

(52) U.S. Cl.
CPC .............. *B23K 37/00* (2013.01); *C23C 24/04* (2013.01); *F28F 13/06* (2013.01); *B23K 2101/35* (2018.08); *B23K 2103/10* (2018.08)

(58) Field of Classification Search
CPC ....... C23C 24/04; F28F 13/06; B23K 2101/35; B23K 2103/10; B23K 37/00
See application file for complete search history.

(56) References Cited

U.S. PATENT DOCUMENTS

| | | | |
|---|---|---|---|
| 8,025,921 B2 * | 9/2011 | Miyamato | H01L 21/4871 427/427 |
| 10,892,671 B2 * | 1/2021 | Wang | B23K 26/282 |
| 2009/0029180 A1 * | 1/2009 | Oguri | B32B 15/08 427/427.7 |

FOREIGN PATENT DOCUMENTS

| | | | | |
|---|---|---|---|---|
| CN | 104759383 A | * | 7/2015 | ......... B05B 13/0278 |
| CN | 108436270 | | 8/2018 | |

(Continued)

OTHER PUBLICATIONS

Machine translation of CN-104759383: Fan, An automatic spraying production line for section steel and its spraying method, 2015 (Year: 2015).*

(Continued)

*Primary Examiner* — Janie M Loeppke
*Assistant Examiner* — Abigail H Rhue
(74) *Attorney, Agent, or Firm* — Best & Flanagan LLP

(57) ABSTRACT

A welding method for manufacturing a heat sink has the following steps in sequence: removing rust from a first workpiece and a second workpiece, degreasing the first workpiece and the second workpiece, increasing surface roughness of the first workpiece and the second workpiece, performing a copper supersonic cold spray step to the first workpiece and the second workpiece, and then combining the first workpiece and the second workpiece via welding. With the copper supersonic cold spray step and the surface treatment steps before the copper supersonic cold spray step (i.e. rust removal and degreasing, and surface roughness increasing), the solder can be attached to the workpiece tightly in the combining via welding. Thus, the welded workpieces are combined firmly and not be separated easily. If a heat sink component is made through welding work- (Continued)

pieces in the welding method, the heat sink component has higher strength and cannot be destroyed easily.

14 Claims, 1 Drawing Sheet

(51) Int. Cl.
*F28F 13/06* (2006.01)
*B23K 101/34* (2006.01)
*B23K 103/10* (2006.01)

(56) References Cited

FOREIGN PATENT DOCUMENTS

| | | | | | |
|---|---|---|---|---|---|
| CN | 108642488 | A | * | 10/2018 | ............ C23C 24/04 |
| CN | 108796493 | A | * | 11/2018 | ............ C23C 10/08 |
| CN | 109277428 | A | * | 1/2019 | ............ B21C 37/02 |
| TW | 201105450 | | | 2/2011 | |

OTHER PUBLICATIONS

Machine translation of CN-108642488: Bai, Preparation method of high hardness and wear-resistant coating on titanium alloy substrate surface, 2018 (Year: 2018).*
Machine translation of CN-108796493: Chen, A kind of hole sealing modification method of cold spray coating on light metal surface, 2018 (Year: 2018).*
Machine translation of CN-109277428: Chen, A kind of composite print wiring board aluminum plate foundation band and its preparation process, 2019 (Year: 2019).*

* cited by examiner

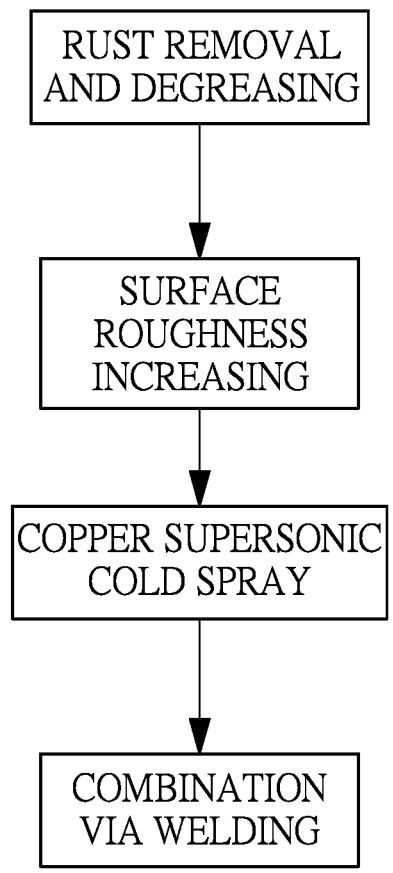

WELDING METHOD FOR MANUFACTURING A HEAT SINK STRUCTURE

CROSS-REFERENCE TO RELATED APPLICATIONS

This application claims priority to Chinese Patent Application No. 201911288382.1 filed Dec. 13, 2019, the disclosure of which is hereby incorporated by reference in its entirety.

BACKGROUND OF THE INVENTION

1. Field of the Invention

The present invention relates to a method of manufacturing a heat sink component, especially to a manufacturing method via welding to combine several components as a heat sink component.

2. Description of the Prior Art

A heat sink component comprises several tiny structures, so making a heat sink component from a single workpiece is a hard task. For example, a heat sink component may comprise a fin assembly and the fin assembly includes multiple fins spaced apart at intervals. If such heat sink component is manufactured from a single metal block, the fin assembly may be shaped via cutting or drilling, which is hard to carry out. Besides, the fins made from such process may weaken the rigidity and strength. As a result, in the current manufacture method, a base and fins are made respectively from multiple workpieces and then the fins are welded on the base. However, some heat sink components are made of aluminum alloy but aluminum alloy cannot be welded easily, such that the welded aluminum alloy workpieces are easy to be separated by an external force.

To overcome the shortcomings, the present invention provides a welding method for manufacturing a heat sink structure to mitigate or obviate the aforementioned problems.

SUMMARY OF THE INVENTION

The main objective of the present invention is to provide a welding method for manufacturing a heat sink structure that can produce a heat sink component with high strength so that the heat sink component cannot be destroyed easily.

The welding method includes the following steps in sequence: (1) removing rust from a first surface of a first workpiece and a second surface of a second workpiece, and degreasing the first surface and the second surface; (2) increasing surface roughness of both the first surface and the second surface; (3) performing a supersonic cold spray process of copper grains to the first surface and the second surface; (4) combining the first surface and the second surface via welding.

Thus, with the copper supersonic cold spray step and the surface treatment steps before the copper supersonic cold spray step (i.e. rust removal, degreasing, and roughness increasing), the solder can be attached to the workpiece tightly during the combining via welding step. Thus, the welded workpieces are combined firmly and cannot be separated easily. If a heat sink component is made through welding workpieces in the aforesaid welding method, the heat sink component has higher strength and cannot be destroyed easily.

Other objectives, advantages and novel features of the invention will become more apparent from the following detailed description when taken in conjunction with the accompanying drawings.

BRIEF DESCRIPTION OF THE DRAWINGS

FIG. 1 is a flow chart of a welding method in accordance with the present invention.

DETAILED DESCRIPTION OF THE PREFERRED EMBODIMENTS

With reference to FIG. 1, a welding method for manufacturing a heat sink structure in accordance with the present invention is provided. The welding method is configured to weld two workpieces and said workpieces are part of a heat sink structure. With more workpieces welded, those workpieces will be combined as a heat sink component. For example, the heat sink component may be a fin assembly including a base and multiple fins.

Hereinafter the welding method of the present invention is described with a first workpiece and a second workpiece. Precisely, a first workpiece may have multiple surfaces and one of said surfaces is a first surface. Similarly, a second workpiece may have multiple surfaces and one of said surfaces is a second surface. The first workpiece may be made from aluminum, copper, or an alloy thereof and the second workpiece may be made from aluminum, copper, steel, or an alloy thereof. In other words, the welding method of the present invention can be adopted to weld aluminum and aluminum, aluminum and copper, aluminum and steel, etc. The welding method of the present invention may include the following steps in sequence: a rust removal and degreasing step, a surface roughness increasing step, a supersonic cold spray process of copper grains (hereinafter referred as "copper supersonic cold spray step"), and a combination via welding step.

The rust removal and degreasing step is to remove rust from the first surface and the second surface and degrease the first surface and the second surface and thereby dyne values of both the first surface and the second surface are larger than or equal to 36 dyn. In a preferred embodiment, the dyne value should be larger than or equal to 38 dyn. Precisely, after the rust removal and degreasing step, to check the dyne values of the first surface or the second surface, a mark may be painted on the first surface and the second surface via a 38 dyne test pen. If an ink of the dyne test pen is stable or spreads outward, the dyne value of the first surface or the second surface is equal to or larger than 38 dyn, and the workpiece is suitable for subsequent manufactures. However, if the ink of the dyne test pen concentrates to drops, the dyne value of the first surface or the second surface is less than 38 dyn and rust removal and surface degreasing should be performed again until the dyne value is equal to or larger than 38 dyn.

In the surface roughness increasing step, 80-grit sandpapers or 120-grit sandpapers may be adopted. The first surface and the second surface should be ground until the surface roughness thereof is increased to 10 μm to 35 μm. In a preferred embodiment, the surface roughness is increased to 15 μm to 25 μm.

In the copper supersonic cold spray step, a copper spray device sprays the air with copper grains in high pressure toward the first workpiece and the second workpiece, so that the copper grains are embedded on the first surface and the second surface. The aforesaid rust removal and degreasing step and the surface roughness increasing step are configured to facilitate the copper grains to be embedded on the first workpiece and the second workpiece, i.e. embedding the copper grains via lower air pressure or lower temperature. In this embodiment, the pressure of air sprayed from the copper spray device is 0.4 MPa to 1.0 MPa, a size of each copper grain is 10 μm to 50 μm, and surface porosity of each copper grain is less than or equal to 10%. Meanwhile, the temperature of the first surface and the second surface is lower than 180° C. In a preferred embodiment, the pressure of sprayed air is 0.5 MPa to 0.8 MPa, the size of each copper grain is 15 μm to 40 μm, the surface porosity of each copper grain is less than or equal to 5%, and the temperature of the first surface and the second surface temperature is lower than 150° C.

Finally, in the combination via welding step, the first surface and the second surface undergoing aforesaid surface treatments step are welded together. In this embodiment, before welding, the first workpiece and the second workpiece are heated until higher or equal to 260° C. Thus, the first workpiece and the second workpiece are combined tightly.

The welding method of the present invention can be carried out to a portion of the first surface and a portion of the second surface. In other words, a specific portion of the first surface and a specific portion of the second surface undergo the rust removal and degreasing step, the surface roughness increasing step, and the copper supersonic cold spray step, and then the specific portion of the first surface and the specific portion of the second surface are combined via welding. Therefore, not the entire first surface and the entire second surface undergo the surface treatments and welding, which reduces manufacturing time and saves manpower.

With the welding method of the present invention, the strength between two combined workpieces is increased significantly. In a pulling force test, the welding surface with a 48 mm by 51 mm rectangular shape can endure a 70 kgw pulling force. Therefore, the heat sink component made via the welding method of the present invention has higher strength and cannot be destroyed easily.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A welding method for manufacturing a heat sink structure comprising the following steps in sequence:
    removing rust from a first surface of a first workpiece and a second surface of a second workpiece, and degreasing the first surface and the second surface;
    increasing surface roughness of both the first surface and the second surface;
    performing a supersonic cold spray process of copper grains to the first surface and the second surface, wherein, during the supersonic cold spray process of copper grains, a pressure of an air source being 0.4 MPa to 1.0 MPa, a size of each copper grain being 10 μm to 50 μm, surface porosity of each copper grain being less than or equal to 10%, and temperatures of both of the first workpiece and the second workpiece being less than or equal to 150° C.; and
    combining the first surface and the second surface via welding after temperatures of both of the first workpiece and the second workpiece reach larger than or equal to 260° C.

2. The welding method as claimed in claim 1, wherein in the step of removing rust and degreasing the first surface and the second surface, dyne values of both the first surface and the second surface are made larger than or equal to 38 dyn.

3. The welding method as claimed in claim 2, wherein in the step of increasing surface roughness of both the first surface and the second surface, the surface roughness of both the first surface and the second surface is increased to 15 μm to 25 μm.

4. The welding method as claimed in claim 3, wherein during the supersonic cold spray process of copper grains, the pressure of the air source is 0.5 MPa to 0.8 MPa.

5. The welding method as claimed in claim 4, wherein during the supersonic cold spray process of copper grains, the size of each copper grain is 15 μm to 40 μm.

6. The welding method as claimed in claim 5, wherein during the supersonic cold spray process of copper grains, the surface porosity of each copper grain is less than or equal to 5%.

7. The welding method as claimed in claim 1, wherein in the step of increasing surface roughness of both the first surface and the second surface, the surface roughness of both the first surface and the second surface is increased to 15 μm to 25 μm.

8. The welding method as claimed in claim 1, wherein during the copper supersonic cold spray process, the pressure of the air source is 0.5 MPa to 0.8 MPa.

9. The welding method as claimed in claim 1, wherein during the supersonic cold spray process of copper grains, the size of each copper grain is 15 μm to 40 μm.

10. The welding method as claimed in claim 1, wherein during the supersonic cold spray process of copper grains, the surface porosity of each copper grain is less than or equal to 5%.

11. A welding method for manufacturing a heat sink structure comprising the following steps in sequence:
    removing rust from a portion of a first surface of a first workpiece and a portion of a second surface of a second workpiece, and degreasing said portion of the first surface and said portion of the second surface,;
    increasing surface roughness of both said portion of the first surface and said portion of the second surface;
    performing a supersonic cold spray process of copper grains to said portion of the first surface and said portion of the second surface, wherein, during the supersonic cold spray process of copper grains, a pressure of an air source being 0.4 MPa to 1.0 MPa, a size of each copper grain being 10 μm to 50 μm, surface porosity of each copper grain being less than or equal to 10%, and temperatures of both said portion of the first surface of the first workpiece and said portion of the second surface of the second workpiece being less than or equal to 150° C.; and
    combining said portion of the first surface and said portion of the second surface via welding after temperatures of both of the first workpiece and the second workpiece reach larger than or equal to 260° C.

12. A welding method for manufacturing a heat sink structure comprising the following steps in sequence:

removing rust from a first surface of a first workpiece and a second surface of a second workpiece, and degreasing the first surface and the second surface, wherein the first workpiece comprises a different material than the second workpiece;

increasing surface roughness of both the first surface of the first workpiece and the second surface of the second workpiece;

performing a supersonic cold spray process of copper grains to the first surface and the second surface, wherein during the supersonic cold spray process of copper grains, a pressure of an air source being 0.4 MPa to 1.0 MPa, a size of each copper grain being 10 μm to 50 μm, surface porosity of each copper grain being less than or equal to 10%, and temperatures of both the first workpiece and the second workpiece being less than or equal to 150° C.; and combining the first surface and the second surface via welding after temperatures of both the first workpiece and the second workpiece reach larger than or equal to 260° C.

13. The welding method as claimed in claim 12, wherein in the step of removing rust and degreasing the first surface and the second surface, dyne values of both the first surface and the second surface are made larger than or equal to 38 dyn.

14. The welding method as claimed in claim 13, wherein in the step of increasing surface roughness of both the first surface and the second surface, the surface roughness of both the first surface and the second surface is increased to 15 μm to 25 μm.

* * * * *